United States Patent [19]

Irie et al.

[11] 4,048,666

[45] Sept. 13, 1977

[54] ELECTRIC SAFETY SWITCH CIRCUITRY

[75] Inventors: Yutaka Irie; Tomoji Murata, both of Toyokawa; Kenji Shibazaki, Aichi; Shunji Yamamoto, Shinshiro; Shigemitsu Shimizu, Toyokawa; Yukio Tokura, Toyohashi, all of Japan

[73] Assignee: Minolta Camera Kabushiki Kaisha, Japan

[21] Appl. No.: 677,088

[22] Filed: Apr. 15, 1976

Related U.S. Application Data

[63] Continuation-in-part of Ser. No. 638,269, Dec. 5, 1975, abandoned.

[30] Foreign Application Priority Data

Dec. 5, 1974 Japan .................. 49-140794
Dec. 25, 1974 Japan .................. 49-4482[U]

[51] Int. Cl.² ............................... H01H 47/00
[52] U.S. Cl. .................... 361/189; 361/195
[58] Field of Search ............... 317/9 AC, 135 R, 137, 317/139, 141, DIG. 10; 361/189, 191, 195

[56] References Cited

U.S. PATENT DOCUMENTS

| | | | |
|---|---|---|---|
| 2,375,229 | 5/1945 | Klemperer | 317/139 |
| 2,882,456 | 4/1959 | Koch | 317/135 R |
| 2,962,633 | 11/1960 | Raymond | 317/135 R |
| 3,662,227 | 5/1972 | Morrison et al. | 317/135 R |

Primary Examiner—Gerald Goldberg
Attorney, Agent, or Firm—Watson, Cole, Grindle & Watson

[57] ABSTRACT

In an electric safety switch circuit for use in apparatus having at least one safety switch for detecting at least one abnormal condition of the apparatus, switching elements are connected between a power source and the apparatus. The voltage of the main power source is transformed to a lower voltage and the switching elements are opened or closed by control circuitry in the low voltage circuit. The at least one safety switch is connected to the voltage transformer and the control circuitry such that the actuation of the at least one safety switch upon detection thereof of an abnormal condition actuates the control circuitry to open the switching elements and disconnect the apparatus from the power source.

In one embodiment a primary switch is interconnected between the power source and the electric safety switch circuit, and in a modified embodiment the primary switch is connected in the electric safety switch circuit itself. The reduction in the voltage and current in which the primary switch and/or the at least one safety switch are interconnected results in improved reliability, durability, and operating life of the electric circuit as well as providing commensurate decreases in the cost of the electric circuit.

9 Claims, 5 Drawing Figures

ELECTRIC SAFETY SWITCH CIRCUITRY

This is a Continuation-in-Part application of application Ser. No. 638,269, filed Dec. 5, 1975, now abandoned.

BACKGROUND OF THE INVENTION

This invention relates to an electric circuit with safety switches, and more particularly to such an electric circuit for use in an apparatus of the type, in which there are provided safety switches in the respective portions thereof, for example such as a door of the apparatus, so that abnormal conditions, such as an open door, may be detected by means of the aforesaid safety switches, thereby interrupting an electrically conductive path between at least one of a plurality of loads in the apparatus and the main electric power source.

FIG. 1 shows such a prior art electric circuit with safety switches of the type described. As shown, safety switches S1, S2 . . . Sn, which are provided in suitable positions and components of the apparatus, are connected with main electric power source E through main switch Sm in series with load Z of the apparatus. The contacts associated with safety switches S1 . . . Sn are opened in the event of an abnormal condition in a reproducing apparatus, for example, thereby interrupting the electrical conductive paths between load Z and main electric power source E.

However, since the aforesaid prior art electric circuit includes a plurality of safety switches connected in series in a circuit which connects the main electric power source with a load, the safety switches are actuated at the same voltage as that of the main electric power source, and also with the same current which is being provided to the apparatus. As a result, if the apparatus requires a high operating voltage, and/or consumes a great amount of current, the respective safety switches must withstand and meet the electrical requirements accruing from the use of apparatus of such a large capacity. This in turn requires increased capacity of the safety switches, with their resulting low efficient operation. More specifically, for example, the increased size of the safety switches requires a considerably higher external force for switching the contacts of the safety switches. Thus, in case such safety switches are provided for detecting the open or closed position of a door in an apparatus, there is the disadvantage that a commensurately greater force is required for opening and closing the door. If safety switches having large electrical capacity are used to conduct a high voltage or high current, there results the well-known switching contact discharging phenomenon, whereby the switch contacts are damaged, which impairs the service life, durability and reliability of the safety switches themselves. Additionally, there is another shortcoming of prior art apparatus of the type specified herein and that occurs in apparatus requiring a high voltage from a main electric power source, which in turn requires high voltage conductors for the connection of the respective safety switches therein. This causes many safety problems. This is particularly true where high voltage conductors are connected to a door of the apparatus, such that the safety switch associated therewith to detect the open or closed condition thereof, itself causes a dangerous condition. More particularly, as shown in FIG. 1, when the contacts of safety switch S2 are opened, load Z will be disconnected from main electric power source E, although the portion of the circuitry from main power source to safety switch S2 remains energized at a high voltage. Accordingly, it would be particularly dangerous to check the interior of an apparatus with such a door of the apparatus, for example, kept open.

SUMMARY OF THE INVENTION

It is a principal object of the present invention to provide an electrical safety switch circuit which affords improved safety features and which may be employed in various kinds of apparatus.

It is another object of the present invention to provide an electrical safety switch circuit which is well adapted for use in apparatus requiring high voltage and/or high current from a main electrical power source.

It is a further object of the present invention to provide an electrical circuit with safety switches which allows a reduction in the capacity requirements of the safety switches and improves the operable use of the safety switches.

It is a still further object of the present invention to provide an electrical circuit with safety switches which improves the durability and reliability of the safety switches.

The aforesaid objects and features of the present invention may be readily attained by an electrical safety switch circuit according to the present invention, a primary feature of which is a low voltage circuit that includes the safety switches which are provided in the respective components, such as a door, of the apparatus that is being monitored by the electrical safety switch circuit of the invention. The low voltage circuit is connected to a main electric power source in parallel with the load of the monitored apparatus, so that an abnormal condition of the respective components or operation thereof may be detected by the aforesaid safety switches. Thus, the electrical conduction path between the aforesaid load and the main electric power source is interrupted through the low voltage circuit. More particularly, a pair of switch contacts are controlled by a main switch and are adapted to open or close the conductive path between the main electric power source and the load. The switch contacts are further controlled by control means in the low voltage circuit, commensurate with the opening and closing operations of the safety switches, thereby further improving the safety characteristics of the present invention.

These and other objects, advantages and features of the invention will become apparent from the following description thereof when read in conjunction with the accompanying drawings which illustrate exemplary embodiments of the invention.

BRIEF DESCRIPTION OF THE DRAWINGS

In the following description, like parts are designated by like reference numerals throughout the several diagrams of the attached drawings.

DETAILED DESCRIPTION OF THE INVENTION

Figure 2:
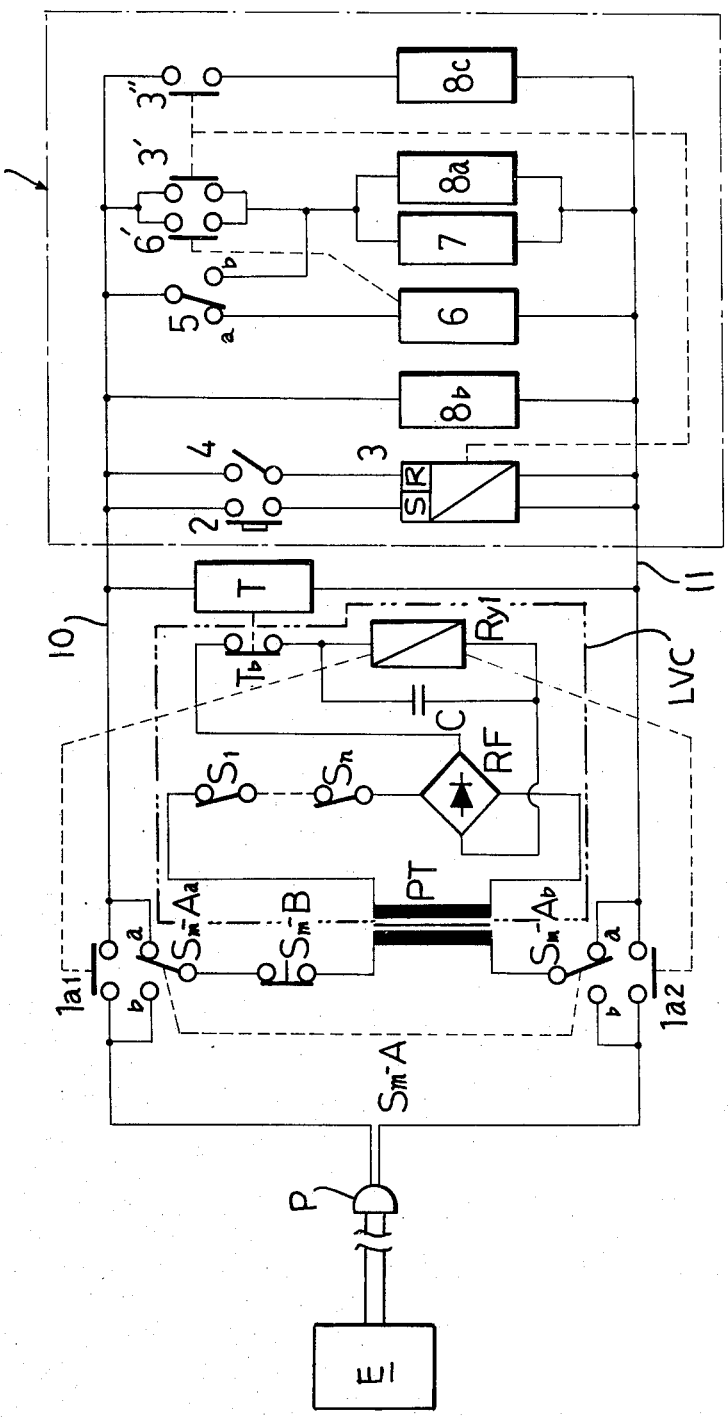
FIG. 2 is a diagram of an embodiment of an electric circuit with safety switches in accordance with the present invention.

As shown in FIG. 2, a load Z, such as for example a motor, lamp or the like, in an electrical apparatus (shown enclosed by a one-point chain line) is connected by contacts 1a1, 1a2 of relay Ry1 with primary electric power source E through connector plug P. Connected in parallel with the load Z is timer T which is adapted to prevent load Z from being maintained connected to primary electric power source E for a greater period of time than is required. The detailed description of the components of load Z are described hereinafter. Voltage-drop transformer PT is also connected in parallel with load Z by ON switch Sm-A, having ganged movable contacts Sm-Aa, Sm-Ab, adapted to interconnect load Z and main electric power source E, and by OFF switch Sm-B, adapted to release or interrupt the connection between load Z and main electric power source E. The secondary of transformer PT is connected in low voltage circuit LVC (shown enclosed by a two-point chain line) which includes relay Ry1, adapted to control the connection between the main electric power source and load Z by closing and opening contacts 1a1, 1a2. Low voltage circuit LVC further includes rectifier RF, having on its output side circuit including relay Ry1 connected Ry1. series with contact Tb of timer T, and capacitor C connected in parallel with relay Ryl. Safety switches S1 . . . Sn are physically provided in the respective component, such as a door, of an associated apparatus which the electrical safety circuit of the invention monitors. However, as shown in FIG. 2, switches S1 . . . Sn are electrically connected in the secondary of transformer PT in low voltage circuit LVC.

The following description of the operation of the electric circuit of FIG. 2 assumes that the respective components, such as a door, of the monitored apparatus are in their operable conditions, i.e., the contacts of safety switches S1 . . . Sn are closed, and additionally, with ON switches Sm-Aa, Sm-Ab actuated, that is, the movable contacts Sm-Aa, Sm-Ab are switched in unison from contacts a to b by actuation of switch Sm-A. Also, timer switch Tb is closed. Under the above-stated conditions, electrical power is provided to low voltage circuit LVC through the connection path of movable contact Sm-Aa, OFF switch Sm-B, the primary of transformer PT, and movable contact Sm-Ab to main electric power source E through plug P. Thus, relay Ry1 is actuated to close contacts 1a1, 1a2, to connect main electric power source E and load Z through conductors 10, 11. ON switch Sm-A is a self-restoring switch, and thus movable contacts Sm-Aa and Sm-Ab thereof are returned to their respective contact a, when switch Sm-A is not actuated. During the aforementioned switching operation of switch Sm-Aa, relay Ry1 remains actuated due to the discharging action of capacitor C connected in parallel with relay Ry1 as well as by the delaying action of relay Ry1 itself. As a result, contacts 1a1, 1a2 are maintained in their closed positions, and low voltage circuit LVC is maintained connected with main electric power source E by the path formed by contacts 1a1, movable contact Sm-Aa on fixed contact a, OFF switch Sm-B, the primary of power transformer PT, and movable contact Sm-Ab on contact a, so that the conductive path between main electric power source E and load Z is maintained.

The following description is directed to the condition where load Z has been connected with main electric power source E and OFF switch Sm-B is actuated. The actuation of OFF switch Sm-B causes its contacts to open, thereby interrupting the aforementioned connecting path through contacts 1a1, 1a2 to low voltage circuit LVC. Thereby, the current to relay Ry1 is interrupted, so that contacts 1a1, 1a2 are opened and thus the conductive path between load Z and main electric power source E is interrupted. OFF switch Sm-B is also a self-restoring switch, like ON switch Sm-A, however, its restoration to its initial position is effected only after contacts 1a1, 1a2 have been opened. After switch Sm-B has returned to its initial closed position, and as contacts 1a1, 1a2 have already been opened, low voltage circuit LVC is maintained disconnected from main electric power source E, thereby maintaining the disconnection between load Z and main electric power source E.

The following description relates to the case where either one of safety switches S1 . . . Sn is opened, upon detection of an abnormal condition in a specific portion or component of the apparatus monitored by the electrical safety circuit of the invention. In that case, regardless of whether low voltage circuit LVC is connected with main electric power source E or disconnected therefrom, the secondary circuit of power transformer PT to rectifier RF is disconnected and the current to relay Ry1 is interrupted, so that the connection between load Z and main electric power source E is also interrupted by the opening of contacts 1a1, 1a2, notwithstanding the aforesaid operations of ON switch Sm-A and OFF switch Sm-B.

The operation of timer T is initiated simultaneously with the interconnection of load Z to main electric power source E. Timer T may preferably be a counting circuit and after it has counted to a predetermined number, contact Tb is opened, thereby providing a means of preventing load Z from being connected with main electric power source E for a greater period of time than required. However, it is to be understood that timer T is not necessary for the operation of the electrical safety switch circuit of the invention and thus it may be omitted or provided as desired.

Figure 3:
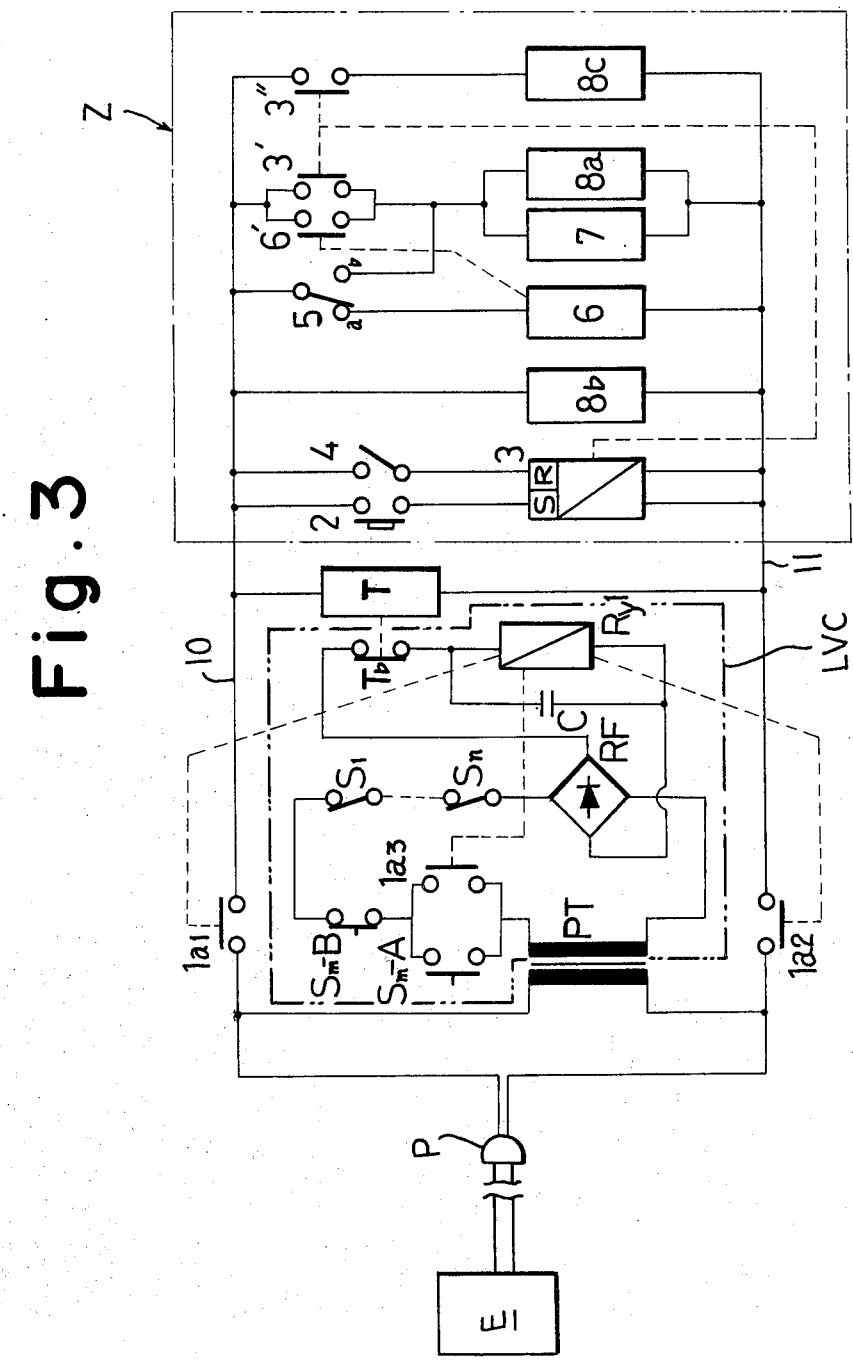
FIG. 3 is a diagram showing one exemplary modification of the electric circuit of FIG. 2.

FIG. 3 shows a diagram illustrative of one modification of the electrical safety switch circuit according to the present invention. In FIGS. 2 and 3, load Z is the same. However, the circuit of FIG. 2 controls the power to low voltage circuit LVC from the primary of power transformer PT, whereas in the modified embodiment of FIG. 3, the control of power to low voltage circuit LVC is obtained in the secondary of power transformer PT. As shown, ON switch Sm-A and OFF switch Sm-B are connected in low voltage circuit LVC to enable the use of smaller capacity switches, thereby improving the reliability and durability thereof. The arrangement and operation of those portions of the circuit shown in FIG. 3 that are similar to those of the circuit shown in FIG. 2, are omitted in the following description. Switch Sm-B is normally closed and the depression of switch Sm-A completes the secondary circuit through the secondary winding of power transformer PT (assuming as in the embodiment of FIG. 2 that safety switches S1 . . . Sn and timer switch T6 are closed). Relay Ry1 is thereby actuated closing relay contacts 1a1, 1a2 to provide an interconnection of power source E to load Z and timer T. The actuation of relay Ry1 also closes relay contact 1a3 which is parallelly connected with switch Sm-A. Subsequent to the closing of contacts 1a1, 1a2 and 1a3, switch Sm-A is restored to its open position. As in the embodiment of FIG. 2, capacitor C insures that relay Ry1 remains actuated during the opening of switch Sm-A until relay contact 1a3 has closed. Thus, after the opening of switch Sm-A the secondary circuit is completed through switches Sm-B, relay contact 1a3 and the secondary winding of power transformer PT. Thus in the embodiment of FIG. 3, the movable contacts Sm-Aa and Sm-Ab of FIG. 2 are eliminated and in lieu thereof there is a single contact switch indicated as Sm-A in FIG. 3. Further, relay Ry1 in the embodiment of FIG. 3 is provided with an additional relay contact 1a3 in parallel with switch Sm-A to maintain the secondary circuit of power transformer PT, thereby providing power to relay Ry1 and maintaining power from main power source E to load Z through relay contacts 1a1 and 1a2.

Therefore, because in the embodiment of FIG. 3 the switch contacts necessary for maintenance of power to relay Ry1 are in the secondary low voltage circuit of power transformer PT, low voltage and current capacity switches may be used, thereby increasing the operating life and reliability of the circuitry. Additionally, the elimination of movable contacts Sm-Aa, Sm-Ab and their associated fixed contacts, also increases the reliability and operating life of the circuitry.

The preceding description of FIGS. 2 and 3 was directed to a portion of the electrical safety circuit itself. The following description is directed to an exemplary application of such circuity in an electrostatic copier apparatus containing safety switches S1 ... Sn.

The load Z shown in FIGS. 2 and 3 is a control circuit, for use in an electrostatic copier or reproducing apparatus, which energizes a drive motor adapted to drive a transport means for copy sheets, but only during a reproduction cycle. Such control circuitry is also adapted to energize the aforesaid motor for a given period of time by a timer means when the reproducing apparatus is actuated, so that the operational noise, consumption of electrical energy and use of the motor may be minimized. Additionally, the adverse effects caused by the copy sheet remaining in the copy sheet transport path if the feeding of current to the reproducing apparatus or copier is interrupted, may be prevented.

The reproduction cycle is initiated by actuation of reproduction-starting switch 2. Holding relay 3, which closes relay contacts 3', 3'', is adapted to be set concurrently when reproduction-starting switch 2 is turned on. Relay 3 is reset by resetting switch 4 to open contacts 3', 3''. Resetting switch 4 is designed to turn on, after the reproducing operation has been commenced by the actuation of reproduction-starting switch 2. For instance, with a copier using a rolled sheet supply, resetting switch 4 is actuated in synchronism with a cutting means for severing the rolled sheet supply. Copy sheet detecting switch 5 is physically positioned in the copy sheet transporting path, and is normally at contact a. Detecting switch 5 is actuated by the leading edge of a transported copy sheet after the commencement of the reproducing operation from contact a to b, and remains at contact b until the trailing edge of the copy sheet has passed through copy sheet detecting switch 5. For that reason, resetting switch 4 is actuated after copy sheet detecting switch 5 has been changed over from contact a to contact b by the leading edge of the copy sheet.

Timer 6 is connected with contact a of copy sheet detecting switch 5 and is adapted to close switch 6' of timer 6 at the instant copy sheet detecting switch 5 is moved from contact a. Additionally, timer 6 is adapted to maintain contact 6' closed for a given period of time thereafter, subsequent to which switch 6' is opened and maintained in its open condition. The period from the time when timer 6 is energized until contact 6' is opened should be preferably set to enable the feeding, transporting and discharging of an individual copy sheet. Sheet transporting drive motor 7 is connected with contact b of copy sheet detecting switch 5 and to main electric power source E through parallelly connected timer switch 6' and relay contact 3'. Load 8a, such as an eraser lamp, is connected in parallel with drive motor 7. The feeding of current to drive motor 7 and load 8a is therefore controlled in accordance with the aforedescribed actuation of copy sheet detecting switch 5, timer switch 6' and relay contact 3'. As is known to those skilled in the art, drive motor 7 is not necessarily limited to only driving the copy sheet transporting means and may be used as a main drive motor for driving other components such as a photosensitive member or the like. Load 8b, which is connected with electric power source E only through contacts 1a1, 1a2, consists of a temperature adjusting means including a heat source for the copier apparatus. Load 8c, which is connected with electric power source E through relay contact 3'' consists of an electromagnetic clutch for the copy-sheet feeding means. The above described loads 8a, 8b and 8c respectively represent a load which is to be actuated only at the time of the preparation of a copy, a load that is preferably continuously actuated in synchronism with the ON-OFF actuations of relay contacts 1a1, 1a2, and a load which is to be actuated only at the commencement of reproduction. However, the above loads are not necessarily limited to the aforesaid classification in an actual copier apparatus, but are illustrated as such only for the purpose of indicating the representative types of loads that are found in apparatus with which the electrical safety switch circuitry of the invention operates.

Figure 1:
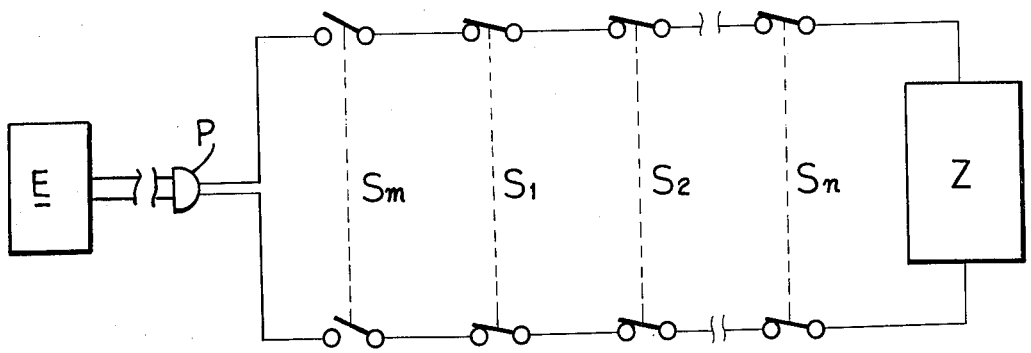
FIG. 1 is a diagram of an exemplary prior art electric circuit with safety switches, shown for the purpose of establishing a reference point of departure for the present invention.
Figure 4:
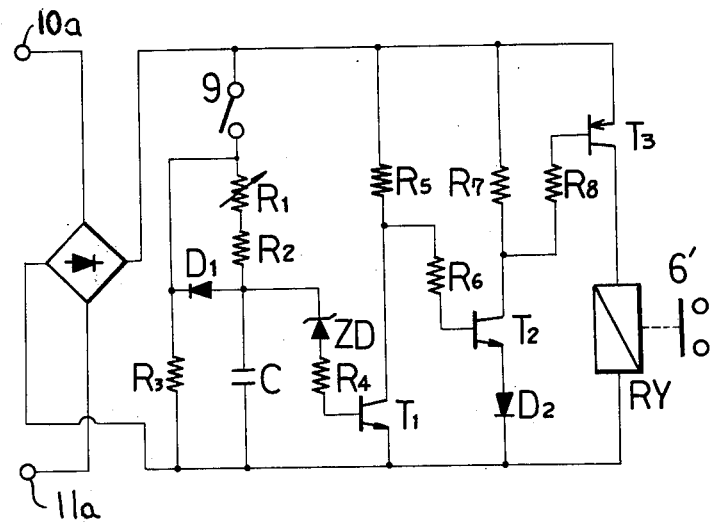
FIG. 4 is a circuit diagram illustrative of one example of timer circuit 6 shown in FIG. 3.
Figure 5:
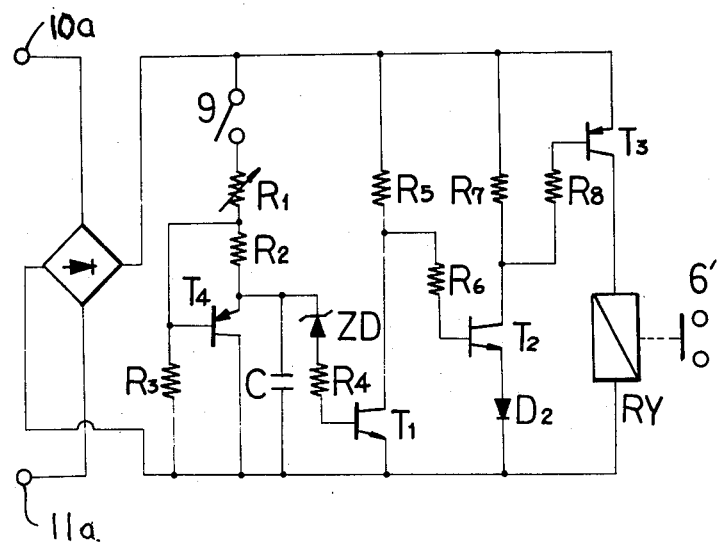
FIG. 5 is a circuit diagram showing one modification of the timer circuit shown in FIG. 4.

As the operation of timer 6 is necessary to more fully understand the manner in which the electrical safety switch circuitry of the present invention operates to control the copier apparatus control circuit represented by load Z in FIGS. 2 and 3, the following description is directed to the embodiments of timer 6 in FIGS. 4 and 5.

FIG. 4 is an electric circuit diagram showing an example of timer 6. Terminals 10a, 11a are respectively connected to an electric power source (not shown). Switch 9 is designed to be closed only when copy sheet detecting switch 5 is connected to contact a. Relay RY controls the actuation of timer contact 6', and maintains timer contact 6' in its closed position for a given period of time. R1 is a variable resistor adapted to set the timing for timer 6. When switch 9 is open, transistor T1 is nonconductive, and transistors T2, T3 are conductive, whereby relay RY is energized to maintain timer contact 6' closed. The necessary bias for transistors T2, T3 is established by resistors R5, R6, diode D2, and resistors R7, R8, respectively as is known to those skilled in the art. When switch 9 is changed from its open position to its closed position in synchronism with the actuation of copy sheet detecting switch 5, capacitor C is charged through variable resistor R1 and fixed resistor R2, so that transistor T1 is turned on, whereupon transistors T2, T3 are turned off. This interrupts the current to relay RY, in accordance with the time it takes for capacitor C to charge to a voltage that is primarily dependent on the breakdown voltage of Zener diode ZD, and then timer contact 6' is opened. Thus, the timing period of the timer is determined primarily in accordance with the charging rate of capacitor C which is adjusted according to the resistance of variable resistor R1. When switch 9 is closed, diode D1 is back-biased. However, after capacitor C discharges and switch 9 is opened, diode D1 is forward biased by the remaining charge voltage on capacitor C, and discharges capacitor C through resistor R3, whereby the timer circuit is ready for another timing operation.

Similarly, FIG. 5 shows an electric circuit illustrative of another example of timer 6 and in this modified embodiment, diode D1 of FIG. 4 is replaced by transistor T4. When switch 9 is changed from its open position to its closed position in synchronism with the action of copy sheet detecting switch 5, capacitor C is discharged as transistor T4 is initially turned on, as the base and emitter voltages of transistor T4 are essentially the same voltage. As transistor T4 conducts and discharges capacitor C, the emitter voltage of transistor T4 becomes substantially more negative than the base voltage and transistor T4 is cut-off. The resistances of R2 and R3 are selected to obtain the desired operation of transistor T4 as is well known to those skilled in the art. With transistor T4 non-conductive, capacitor C is charged through variable resistor R1 and fixed resistor R2, such that transistor T1 is turned on, whereupon transistors T2, T3 are turned off in the same manner as described above with respect to FIG. 4. This interrupts the current to relay RY after a given lapse of time, and then timer contact 6' is opened. Thus, in the circuit of FIG. 5, any remaining charge on capacitor C is discharged immediately after switch 9 is closed, whereas in FIG. 4, the remaining charge on capacitor C is discharged when switch 9 is opened.

The following description relates to the operation of FIGS. 2 and 3, and in particular to the manner in which load Z is controlled and monitored by the operation of safety structures S1 . . . Sn and timer 6. When power is applied to load Z from main electric power source E through the closure of contacts 1a1, 1a2, current is provided to load 8b, while the temperature of the fixing means therein is adjusted in a manner known to those skilled in the art. Concurrently therewith, timer 6 is energized through contact 5a of copy sheet detecting switch 5, whereby contact 6' of timer 6 is maintained closed for a given period time as described above. Thereby, drive motor 7 and load 8a are energized to respectively drive the copy sheet transporting means and to illuminate an eraser lamp and other components of the copier. Thereafter, timer contact 6' is released or opened by the aforedescribed operation of timer circuit 6 to interrupt the current to drive motor 7 and load 8a. Subsequently, when reproduction-starting switch 2 is turned on, holding relay 3 is set to close relay contacts 3', 3'' thereby drive motor 7 and load 8a are again energized, and load 8c is also energized. Thus, the resulting actuation of the electromagnetic clutch of the copy sheet feeding means causes a copy sheet to be introduced onto the copy sheet transporting path. The movable contact of copy sheet detecting switch 5 in the copy sheet transporting path is changed over from contact a to contact b by the leading edge of the copy sheet. At this time, the current to timer 6 is interrupted, and timer contact 6' is closed.

Thereafter, when resetting switch 4 is turned on, holding relay 3 is simultaneously reset, and relay contacts 3', 3'' are simultaneously opened. The opening of relay contact 3'' causes interruption of the current to load 8c. However, even if relay contact 3' is opened, the excitation of drive motor 7 and load 8a are maintained because although the current to timer 6 is shut off, timer contact 6' is maintained in its closed position. Then, with further transport of the copy sheet, the trailing edge thereof passes through copy sheet detecting switch 5 to change it over from contact b to contact a. At this time, timer 6 is energized and timer contact 6' is opened. However, since timer contact 6' had been maintained in its closed position for a given period of time, after it had been initially closed, the excitation to drive motor 7 and load 8a from conductors 10 and 11 was maintained for a sufficient time so that the copy sheet is discharged out of the reproducing apparatus by means of the copy sheet transporting means. After the discharge of the copy sheet, timer contact 6' is opened by timer 6, and the current to drive motor 7 and load 8a is interrupted. The excitation to load 8a is maintained as long as contacts 1a1 and 1a2 are closed.

The following description is directed to the case where the current to the aforesaid circuits is temporarily interrupted during the preparation of a copy, for any reason, such as for example the opening of contacts 1a1, 1a2. If the current is temporarily interrupted, when copy sheet detecting switch 5 is maintained closed on contact a, upon resumption of the power, drive motor 7 is energized for a given period of time by the operation of timer 6 which closes timer contact 6'. Thus, even if a copy sheet is within the copy sheet transporting path, at the time of an interruption of the current, the copy sheet is discharged out of the reproducing or copier apparatus by the copy sheet transporting means. However, when copy sheet detecting switch 5 is maintained closed on contact b, drive motor 7 is connected to conductor 10 through contact b of copy sheet detecting switch 5 and timer contact 6'. Thereafter, in case copy sheet detecting switch 5 is changed over to contact a, drive motor 7 is connected to conductor 10 for a given period of time by the operation of timer 6 maintaining timer contact 6' closed. Thereby, as in the preceding case, a copy sheet may be discharged out of the reproducing apparatus, even if the copy sheet is within the copysheet transporting path during a temporary interruption of power.

In a reproducing or copier apparatus, with the above described reproduction control circuit, drive motor 7 is driven only during copy reproduction, so that excessive operation of the drive motor is eliminated, with the resulting elimination of copier noise, unwanted consumption of electric energy and unnecessary use of the drive motor. Additionally, drive motor 7 is driven for a fixed period of time controlled by timer 6, subsequent to the application of current to the reproducing apparatus for driving the copy sheet transporting means. Thus, in the event that the current to the reproducing apparatus is interrupted due to an inadvertent accident and the like, with a copy sheet left within the reproducing portion of the apparatus, and current is reapplied to the reproducing apparatus, the remaining copy sheet is discharged from the apparatus by the copy sheet transporting means, thereby eliminating any potential difficulties that may be caused, upon the subsequent reproduction of a copy.

As is apparent from the foregoing description, the electric safety switch circuit of the present invention uses a low voltage circuit, so that the current capacity and physical size of the safety switches used in the apparatus to be controlled need not be increased if the apparatus is energized by a high voltage main electric power source. Moreover, the same size and capacity switches can be used regardless of whether the main power source is of high or low voltage. Also, the reliability and durability of the safety switches is increased as they need only conduct a low current. Another advantageous feature is that the use of a low voltage circuit, and the inherent low current requirements thereof, enables the use of smaller conductors, which decreases the cost and size of the apparatus. Also, the lower voltage and current requirements are, in themselves, an added safety feature of the invention.

In the event that an abnormal condition in the apparatus is detected in any one or more of the safety switches, the connection between the main electric power source and the load of the controlled apparatus is interrupted. Thereby, even if a door of the controlled apparatus is opened without turning off the main power switch, a voltage will not be impressed on the electric circuit because one of the safety switches is opened, thus insuring safety for the operator.

What is claimed is:

1. An electric safety switch circuit for use in an apparatus having at least one safety switch for detecting at least one abnormal condition of said apparatus, comprising:
   a main electric power source for providing power to said electric circuit and said apparatus;
   switching means connected between said power source and said apparatus;
   means responsive to the voltage of said main electric power source for transforming the voltage thereof to a lower voltage;
   means for controlling said switching means to open or close the same;
   said at least one safety switch being connected to said means for transforming and said means for controlling and actuation of said at least one safety switch upon detection thereof of an abnormal condition actuates said means for controlling to open said switching means and disconnect said apparatus from said power source.

2. An electric circuit as in claim 1 further comprising means for timing for actuating said means for controlling to open said switching means after a predetermined time.

3. An electric circuit as in claim 1 wherein said switching means is also connected between said power source and said means for transforming the voltage of said main electric power source whereby actuation of said at least one safety switch upon detection thereof of an abnormal condition actuates said means for controlling to also open said switching means and disconnect said electric circuit from said power source.

4. An electric circuit as in claim 3 wherein said means for controlling is a relay including a pair of relay contacts, said switching means is said pair of relay contacts, and each of said contacts being respectively connected to a respective terminal of said main electric power source.

5. An electric circuit as in claim 4 further comprising primary switching means including a first position for connecting said means for transforming to said main electric power source and a second position for connecting said means for transforming to a respective one of said contacts at the same terminal thereof as said apparatus.

6. An electric circuit as in claim 5 wherein said means for transforming is a transformer having a primary winding connected to said primary switching means and a secondary winding;
   said electrical circuit further comprising means for rectifying connected to one terminal of said secondary winding;
   said at least one safety switch being connected to the other terminal of said secondary winding and said means for rectifying; and
   said relay is connected to the output of said means for rectifying.

7. An electric circuit as in claim 6 further comprising means for timing for controlling the duration of operation os said relay and including switching means connected in series with said relay and said means for rectifying.

8. An electric circuit as in claim 4 wherein said means for transforming is a step-down transformer including a primary winding connected directly to said main electric power source and a secondary winding, and said relay includes a third contact; and
   said electric circuit further comprises means for rectifying, a primary switch, said primary switch and said relay contact being connected in parallel to form a parallel circuit, said at least one safety switch being connected between one terminal of said parallel circuit and an input of said means for rectifying, the other input of said means for rectifying being connected to one terminal of said secondary winding and the other terminal of said parallel circuit being connected to the other terminal of said secondary winding;
   whereby the closing of said primary switch actuates said relay to close said pair of relay contacts and said relay contact whereby said apparatus is connected to said main power source and said means for rectifying is connected to said secondary winding.

9. An electric circuit as in claim 8 further comprising means for timing for controlling the duration of operation of said relay and including second switching means connected in series with said relay and said means for rectifying, whereby the opening of said second switching means by said means for timing opens said pair of relay contacts to disconnect said apparatus from said main power source.

* * * * *

UNITED STATES PATENT OFFICE
CERTIFICATE OF CORRECTION

PATENT NO. : 4,048,666
DATED : Sept. 13, 1977
INVENTOR(S) : Irie et al

It is certified that error appears in the above-identified patent and that said Letters Patent are hereby corrected as shown below:

[30]  Foreign Application Priority Data

Dec. 5, 1974  Japan .......... 49-140794

Dec. 25, 1974 Japan .......... 50-4482[U]

Signed and Sealed this

Twenty-eighth Day of February 1978

[SEAL]

Attest:

RUTH C. MASON
*Attesting Officer*

LUTRELLE F. PARKER
*Acting Commissioner of Patents and Trademarks*